United States Patent [19]

Hockert

[11] Patent Number: 4,688,894
[45] Date of Patent: Aug. 25, 1987

[54] TRANSPARENT RETROREFLECTIVE SHEETS CONTAINING DIRECTIONAL IMAGES AND METHOD FOR FORMING THE SAME

[75] Inventor: Eric N. Hockert, Cottage Grove, Minn.

[73] Assignee: Minnesota Mining and Manufacturing Company, St. Paul, Minn.

[21] Appl. No.: 733,067

[22] Filed: May 13, 1985

[51] Int. Cl.[4] ............................................. G02B 5/128
[52] U.S. Cl. ................................................... 350/105
[58] Field of Search ........................................... 350/105

[56] References Cited
U.S. PATENT DOCUMENTS

| 3,154,872 | 11/1964 | Nordgren | 40/135 |
| 3,503,315 | 3/1970 | de Montebello | 95/18 |
| 3,801,183 | 4/1974 | Sevelin et al. | 350/105 |
| 4,082,426 | 4/1978 | Brown | 350/105 |
| 4,099,838 | 7/1978 | Cook et al. | 350/105 |
| 4,200,875 | 4/1980 | Galanos | 346/1.1 |

FOREIGN PATENT DOCUMENTS 59-148004  8/1984  Japan .

Primary Examiner—John K. Corbin
Assistant Examiner—Vincent J. Lemmo
Attorney, Agent, or Firm—Donald M. Sell; James A. Smith; Robert H. Jordan

[57] ABSTRACT

A directional image is created in substantially transparent retroreflective sheeting comprising a monolayer of microlenses and a partially light transmissive mirror disposed at the rear surfaces of at least some of said microlenses. The image is created by irradiation of the sheeting with a laser beam to form axial markings associated with at least some of the microlenses. The image may be formed in sheeting which has been applied to a document as an overlay.

17 Claims, 2 Drawing Figures

TRANSPARENT RETROREFLECTIVE SHEETS CONTAINING DIRECTIONAL IMAGES AND METHOD FOR FORMING THE SAME

FIELD OF INVENTION

This invention primarily concerns a substantially transparent sheet which includes a partially light transmissive mirror to make the sheeting retroreflective under retroreflective viewing conditions, and which further contains a directional image, i.e., an image that is viewable only within a restricted conical field of view of predetermined angular width and central axis. This invention also concerns a method for forming such sheets.

BACKGROUND ART

Sheeting in which an image of a pattern or legend is built has found a number of important uses, particularly as distinctive labels useful to authenticate an article or document. Such sheeting has found use as validation stickers for vehicle license plates and as security films for driver's licenses, government documents, phonograph records, tape cassettes, and the like, as taught in U.S. Pat. Nos. 3,154,872; 3,801,183; 4,082,426; and 4,099,838. In each of the patents, the built-in images must be incorporated into the sheeting while the sheeting is being constructed.

Sevelin et al., U.S. Pat. No. 3,801,183, discloses a substantially transparent sheeting to be used as an overlay on a document such as a credit card, a pass, a license or phonograph label to serve as an identifying or authenticating means. The sheet is retroreflective over its entire surface area and contains a retroreflecting pattern or legend which is obscure in that it is invisible or only faintly visible to the naked eye under diffuse light and does not obstruct any underlying visual information.

Nordgren, U.S. Pat. No. 3,154,872, and Brown, U.S. Pat. No. 4,082,426, teach other retroreflective sheets containing images that may be obscure, which sheets can be adhesively bonded to documents to make counterfeiting more difficult. The imaged sheets disclosed in those patents are not transparent, however, and so would obstruct information over which they were applied.

Other methods have been developed which use laser irradiation of a sheet material to form directional images therein. These methods rely on opaque masking layers to focus the laser light to a damage locus within a monolayer of microlenses, or to themselves absorb radiation and develop deformations which are viewable as a directional image. If a transparent sheet containing a directional image is desired the opaque masking must be removed after formation of the visible deformations.

Galanos, U.S. Pat. No. 4,200,875, discloses a method of forming directional images in opaque retroreflective sheeting which comprises a specular reflecting layer disposed behind a monolayer of glass microspheres. In that method, laser irradiation of the retroreflective sheeting in an imagewise fashion causes visible structural alterations or modifications in the sheet which are viewable as directional images. Because the Galanos sheeting is opaque, it would obstruct underlying information if adhered to a document as an overlay.

Hockert et al., Jap. Appln. No. 19824/84, filed Feb. 6, 1984, Kokai No. 148004/84, laid open Aug. 24, 1984, forms a directional image in sheeting which comprises a monolayer of microlenses, a masking layer disposed behind the monolayer of microlenses, and a transparent spacing layer located between those two layers. Laser irradiation of the sheeting forms openings in the masking layer which are visible as a directional image. By coloring the transparent spacer layer through the openings and then removing the masking layer, such as with a chemical etch, one can obtain a transparent sheet containing a directional image. The sheet may then be adhered to a document as an overlay which provides a secure means of authenticating the document without interfering with the normal use of the information contained thereon.

SUMMARY OF INVENTION

This invention provides a method whereby directional images may be directly formed in transparent sheeting comprising a monolayer of microlenses and that, in most embodiments of the invention, comprises a partially light transmissive mirror, and further provides novel sheets made according to the new method. By the present invention, directional images may even be formed in a piece of such sheeting that has already been applied as an overlay on a document such as a driver's license or passport. The images formed according to this method are viewable both under diffuse light and under retroreflective conditions.

A sheeting of the invention, with its combination of directional images and partially light transmissive mirror, offers unique benefits as a security film. Although the sheeting is transparent, the partially light transmissive mirror makes the sheeting retroreflective when viewed under retroreflective viewing conditions. As taught in Sevelin et al., U.S. Pat. No. 3,801,183, the mirror may be patterned, with some areas of the mirror having greater reflective efficiency than other areas, so that under retroreflective viewing conditions, a viewer discovers retroreflective images hidden within the sheeting. Insofar as known, the combination in a transparent film of hidden retroreflective images and images that are visible under ordinary diffuse lighting conditions only within a limited conical field of view, has never before been provided. This combination of features offers a unique set of criteria by which the authenticity of a document overlaid with the film can be judged.

Sheeting as described can be prepared by directing a suitable laser beam in an imagewise fashion at a selected angle of incidence to the face of the sheeting. The wavelength of the laser beam is selected such that it is focused by microlenses to form discrete markings in the sheeting at the rear of each microlens which the beam strikes. Each microlens focuses the laser light incident upon it to a small spot—having a diameter that is only a small fraction of the diameter of the microlens—to create a localized marking, e.g., a cavity within an individual microlens, a cavity opening through the back of a microlens, an opening, charring, or other modification within the partially light transmissive mirror, or some combination among these various modifications. These markings may be termed "axial markings", in that the marking associated with each microlens is centered on an axis that extends through the optical center of the microlens and is parallel to, or intersects at a common viewing point or line, the similar axes for the other deformed microlenses in the image area. The resulting set of markings is visible as an image at the angle of incidence of the imaging laser beam.

DETAILED DESCRIPTION

Sheeting to be imaged according to the novel method comprises a monolayer of microlenses embedded in a layer of binder material. The binder material is typically a substantially transparent polymeric material, such as an alkyd resin, polyurethane, or ethylene vinyl acetate. The microlenses are preferably spherical because they may be imaged from virtually any angle of incidence. Microlenses with different geometries may be restricted to narrower angles of effectiveness. An example of nonspherical microlenses is disclosed in de Montebello, U.S. Pat. No. 3,503,315. Glass microlenses are preferred because they tend to be more durable than microlenses formed from other materials.

Microspheres with a refractive index within a range of 1.5 to 2.7 are useful. However, microspheres with refractive indices above 2.4 may introduce coloring, whereas colorless clarity is usually preferred so that the sheet may be as unobtrusive as possible when applied to a document as an authenticating means. Microspheres with a refractive index of approximately 1.8 to 1.9 are preferred, because when partially embedded in the support film and partially exposed above the support film, they will focus white light at approximately the back surface of the microsphere.

The glass microspheres preferably have an average diameter of 10 to 100 micrometers, and are ideally of a uniform diameter of approximately 50-60 micrometers. If the microspheres are much larger, the sheeting tends to become thicker and more expensive to make, and images formed thereon will have less resolution. If the microspheres are much smaller, images formed on the sheeting will have greater resolution, but it is more difficult to uniformly distribute the microlenses when constructing the sheet, and the images formed thereon are less bright because of diffraction losses.

The set of axial markings is visible within a conical field of view whose central axis is determined by the angle of incidence at which the imaging beam is directed to the sheeting. The angular width of the conical field of view is related to the size of the markings. Larger markings are visible as an image across a wider field of view than are smaller markings. The size of a marking is determined by the energy density of the irradiation applied to the sheeting which creates the marking. If a higher-energy-density beam is used to form the deformities, the image will have a wider conical field of view. Similarly, if a beam with a lower energy density is used, the image will have a narrower conical field of view.

Preferably the novel method of this invention employs a laser which has sufficient power to cause an axial marking associated with each of the microlenses which the laser beam strikes. Typically in the case of glass microlenses, a laser adjusted so as to provide a power density of approximately one megawatt per square centimeter at the sheeting's surface is useful. Suitable lasers include pulsed, acousto-optically Q-switched Nd:YAG (Neodymium: Yttrium Aluminum Garnet) lasers, such as the Model 512Q laser available from Control Laser Corporation of Orlando, Fla., which, equipped with a frequency doubler, emits a beam with a wavelength of 532 nanometers in pulses of approximately 200 to 400 nanoseconds in duration.

When forming images on sheeting which comprises a monolayer of the preferred glass microspheres having a diameter of approximately 50-60 micrometers, the laser beam is preferably adjusted to form axial markings having diameters within a range from 1 to 20 micrometers. When the microlenses are substantially all about 50-60 micrometers in diameter and the average diameter of the markings is from 3 to 10 micrometers, each authenticating image is viewable under ordinary diffuse lighting conditions only across a cone of about 10 to 20 degrees. Images composed of larger markings are viewable within larger conical fields of view; however, there would seldom be any reason for a directional image to be visible across a cone exceeding 30 degrees. On the other hand, a directional image which was viewable only across a cone of less than six to eight degrees might be difficult to locate.

As previously indicated, most embodiments of sheeting of the invention include, in addition to a monolayer of microlenses, a semi-transparent, or partially light transmissive, dielectric mirror which reflects a portion of, and transmits another portion of, the light incident upon the microlenses. Such dielectric mirrors are taught in Sevelin, wherein it is also taught to form such mirrors with at least two regions of different retroreflective efficiency, one a legend-defining area and the other a background-defining area, so as to form transparent sheeting containing legends which are obscure, i.e., invisible or only faintly visible to the naked eye, under diffuse light but are readily visible under retroreflective lighting conditions. The novel method may be performed on such sheeting to provide a sheet which contains both the obscure or latent retroreflective legend disclosed by Sevelin and the directional images of this invention.

The partially light-transmissive mirror is typically coated directly on the rear surfaces of the microlenses. In sheeting made with glass microspheres of 1.9 index of refraction partially embedded in, and partially exposed out of, the sheeting so as to have an air interface, white light is focused approximately at the rear of the microspheres. When such sheeting is irradiated with a laser beam of appropriate intensity, typically from 0.01 to 10 megawatts per square centimeter at the surface of the sheeting, and pulse duration, typically from 200 to 400 nanoseconds, cavities tend to be formed at the rear of the microspheres thereby leaving a distinctive marking in the sheeting.

The laser radiation may be directed to the sheet in a pattern, such as through a mask, to form markings at the rear of only a selected portion of the microlenses, or it may be applied uniformly over the whole surface of the sheeting. A sheet is regarded as "imaged" according to this invention whether it is prepared with selectively patterned or with whole-surface radiation, since in either case the sheet has a visibly distinctive appearance at certain angles of viewing and under certain lighting conditions.

A sheet bearing two directional images may be formed, if after directing a laser beam in an imagewise fashion at a sheet at a first selected angle of incidence, a laser beam is directed in imagewise fashion at the sheet at a different selected angle of incidence thereby forming two sets of markings. Further repetitions of the step may be performed to provide a sheet of the invention with more than two images. The angles of incidence selected may be spaced sufficiently far apart that the respective conical fields of view of the different images will not overlap or interfere with each other.

The novel method may also lead to other unique and unexpected visual effects. The set of markings formed in the sheeting by the laser beam are generally visible under ordinary diffuse lighting conditions within a conical field of view as a dark image. When viewed retroreflectively within that conical field of view, the set of markings is visible as an image which is darker than the surrounding retroreflecting background. However, when viewed retroreflectively at an angle somewhat outside that conical field of view, the set of markings can be visible as an image which is brighter than the surrounding retroreflecting background. This effect is seen within a region annular to the conical field of view, with the annular band typically being from 10° to 40° wide. When viewed at an angle outside this annular region of brighter retroreflectivity, the set of axial markings is indistinguishable from the surrounding background and no image is visible.

The precise cause of the annular region of bright retroreflectivity of the set of markings is not fully understood. One explanation is that the laser irradiation may cause separations between the microlenses and the underlying dielectric layer surrounding the primary deformations from which the dark image results. This separation, if it exists, may provide another surface or optical spacing distance which increases the retroreflectivity of the markings when viewed within the region annular to the conical field of view of the dark image.

Another unexpected visual effect may be achieved with sheeting that comprises a monolayer of microlenses, but is free of a dielectric mirror. When irradiated with a laser beam according to the method of this invention, an image is formed which is nondirectional under diffuse light. The image is viewable across a wide angle, generally from any angle at which the surface of the sheeting is visible. Under retroreflective conditions, the image exhibits directionality characteristics similar to those of images formed in sheetings which comprise a dielectric mirror disposed behind the monolayer of microlenses.

Because the sheets formed according to the novel method are transparent, they can easily be adapted to be adhesively bonded over the information areas of a document. Strong transparent adhesives are available which will form such a firm bond to a document that the overlying sheet cannot be removed without visibly damaging the document and sheet, thereby making such overlays a secure means for authenticating a document to which they might be attached. The sheets can be very thin and flimsy, essentially comprising only a layer of microlenses, a layer of binder material in which the microlenses are embedded, a partially light transmissive mirror, and optimally an additional adhesive layer. In one embodiment, as an authenticating device for instance, the image may be made so as to be visible at an angle at which a document is not normally viewed so as not to interfere appreciably with the legibility of the underlying information such as written or printed matter or a photograph. When placed as an overlay directly on the information bearing portion of a document, a driver's license for instance, the sheet prevents tampering with the information and provides a secure form of authentication that does not interfere with the normal use of the document. In another embodiment, the image may be made so as to be visible at an angle at which a document is normally viewed to ensure that the image is brought to a reader's attention.

An advantage of this invention is that a transparent sheet which has already been adhered as an overlay may have a directional image formed therein. This capability allows the information borne by an overlay to be updated and makes more convenient the formation of a limited number of sheets with a particular image contained therein. For instance, a driver's license which had been originally issued with a novel sheet of the invention applied as an overlay as a means of authentication might have a special message, such as a restriction to corrective lenses, incorporated therein at a later date. The restriction can be incorporated in the existing license, thereby avoiding the expense and delay of issuing a replacement. The newly added information will achieve the same degree of security as the images originally contained therein.

Transparent sheets bearing directional images have many uses, most notably as authenticating images or overlays used to ensure that documents, products, or any articles to which they might be attached are genuine. Such sheets can be used by manufacturers or sellers of name brand products to prevent passing off of counterfeit products. The ability to make sheets bearing multiple images further increases this utility. An advantage of the sheets of this invention is the difficulty of removing or tampering with the image without destroying the structural integrity of the sheet. Further, duplicating or reproducing the images would be difficult without expensive and sophisticated equipment and know-how.

Possible uses for sheets imaged according to this invention include driver's licenses, passports, bank cards, credit cards, and identification cards. Other applications wherein the sheets or method of this invention will be useful will be obvious to those skilled in the art.

DESCRIPTION OF DRAWINGS

FIG. 1 shows a substantially transparent retroreflective sheet comprising a monolayer of microlenses 2 which are partially embedded in a transparent polymeric binder 4, and a semi-transparent dielectric mirror 6 which reflects a portion of, and transmits another portion of, the light passing through the outer surface of the microlenses. A discontinuous spacing layer 8, such as a varnish layer, changes the retroreflective efficiency of the dielectric mirror 6 to form an obscure retroreflectively viewable image 10 as taught in Sevelin. The embodiment shown is adapted to be bonded as a transparent overlay to a document or article with a transparent adhesive 12. According to the method of this invention, a laser beam 14 is directed to the sheet in an imagewise fashion at an incident angle $\theta$. The laser beam incident upon a microlens is focused at location 16 thereby forming a marking associated with each microlens which the beam strikes. The set of markings thus formed is disposed such that it is visible as a directional image 18.

FIG. 2 shows another embodiment of a substantially transparent retroreflective sheet imaged according to this invention in which the monolayer of microlenses 2 is embedded in a permanent transparent covering 20. The obscure retroreflectively viewable image 10 is provided by the different retroreflective efficiency of the continuous semi-transparent dielectric mirror 22 and discontinuous semi-transparent dielectric mirror 24. Such sheetings are also taught in Sevelin. A directional image 18 may be formed in such a sheeting according to this invention by laser irradiation at an incident angle $\theta$ with a laser beam 14 of suitable wavelength.

Figure 1:
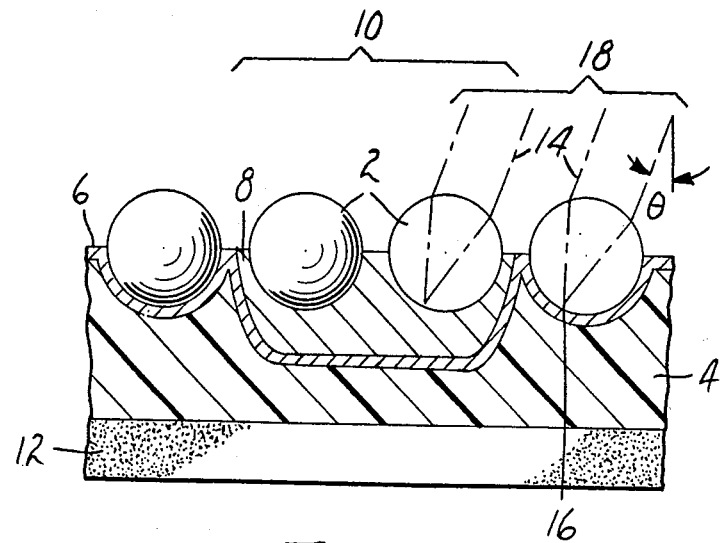
FIGS. 1-2 are schematic sections through fragments of sheets with different embodiments which are examples of some of the sheets which may be imaged according to this invention.
Figure 2:
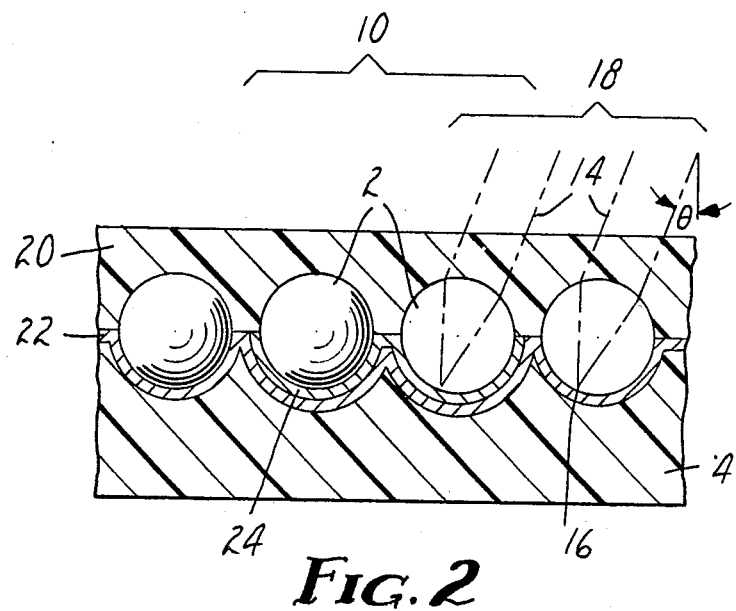

The schematic drawings are not literal section views, e.g. since each circle represents a full circumference as though the microspheres were of uniform diameter and arranged in uniform rows.

The invention will now be more specifically described by the following non-limiting examples. In each instance, the following equipment was used: a Model 512Q Nd:YAG Laser available from the Control Laser Company of Orlando, Fla. which, equipped with a frequency doubler, emits a beam with a wavelength of 532 nanometers in pulses of approximately 200 to 400 nanoseconds in duration; a Model 5-8 Frequency Doubler (Second Harmonic Generator) available from the Inrad Company of Northvale, N.J. a Model 201 power meter available from Coherent, Inc. of Palo Alto, Calif. and a 2X upcollimator manufactured by the Quantrad Corporation of Torrance, Calif.

EXAMPLE 1

A piece of exposed-lens sheeting comprising a monolayer of protruding glass microspheres with a partially light transmissive dielectric mirror disposed on the underside of the microspheres was irradiated from the exposed-lens side with the laser beam. The microspheres had a refractive index of approximately 1.9 and the dielectric mirror comprised vapor-deposited zinc sulfide. Such sheeting is disclosed in Sevelin, U.S. Pat. No. 3,801,183. The laser, equipped with the frequency doubler, was adjusted to direct a beam approximately 1.0 millimeter in diameter with an average power of approximately 400 milliwatts at an incident angle of 0°, i.e., normal, to the surface of the sheeting. The pulse rate of the beam was approximately 2.6 kilohertz. The sheeting was scanned with the laser by manually drawing the sheeting across the path of the beam at approximately 1 centimeter per second.

After laser irradiation an image was visible under diffuse light in the irradiated areas of the sheet as a dark image in a conical field of view. The conical field had as its central axis the incident angle of the laser irradiation and was approximately 10° to 20° wide. The image was visible within approximately the same conical field of view under retroreflective conditions as a dark image. When viewed under retroreflective conditions in an annular region or band approximately 40° wide outside the conical field the image was brighter than the surrounding background.

After the image was examined, an epoxy resin was cured in contact with the exposed microspheres and the polymeric binder material and dielectric mirror were removed to expose the back surfaces of the microlenses. When viewed with a scanning electron microscope, the microspheres in the image areas were seen to have what appeared to be a small cavity opening through their rear surface on an axis normal to the face of the sheet.

EXAMPLE 2

A piece of sheeting similar to that in Example 1 was first laminated as a substantially transparent overlay to a sample driver's license which contained printed information. It was then irradiated according to the procedure and conditions outlined in Example 1.

The resultant image had characteristics similar to that formed in Example 1. The underlying printed information remained viewable under ordinary diffuse lighting conditions.

EXAMPLE 3

A piece of sheeting similar to that in Example 1 was irradiated using the same procedure and conditions as in Example 1 except the laser was adjusted to an average power of approximately 300 milliwatts and a motorized translation stage was used to provide a scanning speed of approximately 0.65 inch per second.

The resultant image had characteristics similar to that formed in Example 1.

EXAMPLE 4

A piece of sheeting similar to that in Example 1 was irradiated using the same procedure and conditions as in Example 3 except the laser was adjusted to an average power of approximately 250 milliwatts.

The resultant image had characteristics similar to that formed in Example 1 except that both the conical field of view and the annular region of brighter retroreflectivity were a few degrees (approximately 5°) narrower than in Example 1.

EXAMPLE 5

A piece of sheeting similar to that in Example 1 was irradiated using the same procedure and conditions as in Example 4 except the laser was adjusted to an average power of approximately 230 milliwatts.

The resultant image had characteristics similar to that formed in Example 4.

EXAMPLE 6

A piece of sheeting similar to that in Example 1 except it comprised no partially light transmissive, dielectric mirror was irradiated from the exposed bead side using the same procedure and conditions as in Example 5 except the laser was adjusted to an average power of approximately 250 milliwatts and a beam diameter of approximately 0.3 millimeter.

The resultant image was visible under ordinary diffuse light conditions as a dark image over a wide angle, essentially any angle from which the front of the sheeting was visible. Under retroreflective viewing conditions the image had similar characteristics as in Example 1, i.e., visible as a dark image within a conical field of view approximately 10° to 20° wide and visible as a bright image in a region annular to the conical field.

What is claimed is:

1. A substantially transparent sheet comprising a monolayer of microlenses and a partially light transmissive mirror disposed behind the rear surfaces of at least some of said microlenses such that under retroreflective viewing conditions the sheet is brightly retroreflective in the areas occupied by the mirror, there being an axial marking in the rear portion of or on the rear surface of at least some of the microlenses, which markings together are viewable as an image across a predetermined conical field in ordinary diffuse light conditions.

2. A sheet as defined in claim 1, wherein the microlenses and associated partially light transmissive mirror in a first, legend defining area have a different retroreflective efficiency than the microlenses and associated partially light transmissive mirror in a second, background defining area such that said sheet has retroreflective legend areas and retroreflective background areas, which areas are substantially indistinguishable under ordinary diffuse light viewing conditions, but which are readily visually discernable from one another under retroreflective conditions.

3. A sheet as defined in claim 1 wherein the microlenses partially protrude from the front of the sheet.

4. A sheet as defined in claim 1 wherein said microlenses are microspheres.

5. A sheet as defined in claim 4 wherein said microspheres are glass.

6. A sheet as defined in claim 4 wherein said microspheres have a refractive index of about 1.9.

7. A sheet comprising a monolayer of microspheres which partially protrude from the front of said sheet, at least some of the microspheres having a marking in their embedded portion, which markings together are viewable across a predetermined conical field of view in ordinary diffuse light as an image, and a partially light transmissive mirror disposed behind the rear surfaces of some of the microspheres such that under retroreflective viewing conditions the sheeting is brightly retroreflective in the areas occupied by the mirror.

8. A sheet as defined in claim 7, wherein the microspheres and associated partially light transmissive mirror in a first, legend defining area have a different retroreflective efficiency than the microspheres and associated partially light transmissive mirror in a second, background defining area such that said sheet has retroreflective legend areas and retroreflective background areas, which areas are substantially indistinguishable under ordinary diffuse light viewing conditions, but which are readily discernable from one another under retroreflective conditions.

9. A substantially transparent sheet comprising a monolayer of microlenses, there being an axial marking in the rear portion of or on the rear surface of at least some of the microlenses which markings together are viewable as an image from the front of the sheeting in ordinary diffuse light conditions, and under retroreflective conditions are viewable as a dark image across a predetermined conical field of view and are viewable as a bright image within a region annular to said conical field of view.

10. A sheet as defined in claim 9 in which the markings are viewable as an image across a wide angle under ordinary diffuse light conditions.

11. A method of forming directional images in substantially transparent sheeting comprising a monolayer of closely spaced microlenses and a partially light transmissive mirror disposed at the rear surfaces of at least some of said microlenses, said method comprising directing a lasser beam at a selected angle of incidence to the face of said sheeting, the wavelength of the laser being selected such that the beam is focused by the microlenses to form a marking in the rear portion of or on the rear surface of each microlens which said beam strikes.

12. A method as defined in claim 11 wherein said microlenses are microspheres.

13. A method as defined in claim 12 wherein said microspheres are glass.

14. A method as defined in claim 12 wherein said microspheres have a refractive index of about 1.9.

15. A method as defined in claim 11 further comprising adapting said sheeting to be adhesively bonded over the information area of a document without appreciably interfering with the legibility of that information.

16. A method as defined in claim 11 wherein said laser beam has a wavelength of approximately 532 nanometers, a pulse duration of from approximately 200 to 400 nanoseconds, a pulse frequency of from approximately 2 to 10 kilohertz, and a power intensity at the surface of said sheeting of approximately from 0.01 to 10.0 megawatts per square centimeter.

17. A method as defined in claim 11 wherein said sheeting has been adhesively bonded over the information area of a document without appreciably interfering with the legibility of that information before said laser beam has been directed at the face of said sheeting.

* * * * *